United States Patent [19]

Broussard, Sr.

[11] Patent Number: 4,728,428
[45] Date of Patent: Mar. 1, 1988

[54] WATER DEGREASING SYSTEM AND METHOD

[75] Inventor: Paul C. Broussard, Sr., Lafayette, La.

[73] Assignee: Paul C. Broussard, Inc., Lafayette, La.

[21] Appl. No.: 938,397

[22] Filed: Dec. 5, 1986

[51] Int. Cl.$^4$ ............................................. B01D 12/00
[52] U.S. Cl. ................................... 210/634; 210/804; 210/195.1; 210/197; 210/202; 210/259
[58] Field of Search ................. 55/29; 34/9; 210/634, 210/804, 805, 177, 178, 181, 194, 197, 198.1, 259, 294, 320, 258, 195.1, 202

[56] References Cited

U.S. PATENT DOCUMENTS

| | | | |
|---|---|---|---|
| 3,810,346 | 5/1974 | Uratani | 55/29 |
| 4,060,912 | 12/1977 | Black | 34/9 |
| 4,124,502 | 11/1978 | Leman | 210/634 |

Primary Examiner—Ivars Cintins
Attorney, Agent, or Firm—George A. Bode; D. Neil LaHaye

[57] ABSTRACT

A water degreaser system which recycles and reclaims absorbing fluid. Freon absorbing fluid is used in a wet spiral absorber-contactor to absorb oil contaminants in produced-water. A downflow spreader system in a processing separator separates the heavier freon from the decontaminated water. Unspent freon is recycled to the absorber-contactor and the clean water is released into the surrounding environment. Spent freon is reclaimed in a distillation treatment unit where the oil is drained off and stored. The freon vapors are drawn off under vacuum from the distillation unit by a jet pump, mixed and condensed with the decontaminated water which drives the jet pump, and then redirected into the system for reuse.

17 Claims, 2 Drawing Figures

WATER DEGREASING SYSTEM AND METHOD

BACKGROUND OF THE INVENTION

1. Field of the Invention

The present invention is related generally to the decontamination of fluids and in particular, to the removal of grease or oil from water.

2. General Background

In the offshore oil and gas drilling industry, water produced as a result of drilling for oil is often contaminated with oil. Present U.S. Environmental Protection Agency (EPA) interim guidelines on offshore produced-water treatment and disposal require that less than forty-eight (48) mg/l of affluent-oil concentration must be present in produced-water prior to disposal into the surrounding offshore waters. This makes it desirable and necessary to improve the quality of produced-water prior to disposal.

Various treatment techniques used in the industry include: free-water knockout (FWKO), skim tanks, plate coalescers, skim piles and flotation units, particularly flotation separators using multi-stage gas-air eductors or vigorous mixing of produced-water with gas-air to form a froth to float the oil to the surface for skimming and leaving a water with some oil contaminants.

Devices addressing the above problems of which applicant is aware include the following:

U.S. Pat. No. 4,060,912 entitled "Absorber-Contactor" discloses a system for removing contaminants, such as vapors and condensibles, from gas which includes a tortuous or spiral path-forming container wherein the contaminated gas is caused to repeatedly pass through a layer of absorbent fluid.

U.S. Pat. No. 4,094,783 entitled "Centrifugal Flotation Separator" discloses a multi-stage, recycling, centrifugal flotation separator system. A closed circular cylindrical vessel has a tray or baffle positioned inside the vessel near the top with an axial opening for the upward flow of froth and gas bubbles. Contaminated liquid and air under pressure are introduced into the vessel through tangential pipes to form bubbles. Gas released at the top of the vessel and liquid from the bottom zone are recycled into the vessel. The clean liquid is drawn from the bottom of the tank close to the outer wall.

U.S. Pat. No. 3,542,675 entitled "Water Treatment" discloses the flowing of liquid saturated with gas into a container and through a venturi structure which reduces the pressure on the saturated liquid to enable gas bubbles to form. The flow rate of the gasified liquid is controlled to maintain a predetermined ratio to the flow rate of the contaminated liquid flowing through the container.

While the above have demonstrated a certain degree of effectiveness in removing contaminants, a higher degree of efficiency has been sought in the industry.

SUMMARY OF THE PRESENT INVENTION

The preferred embodiment of the apparatus of the present invention solves the aforementioned problems in a staightforward and simple manner. What is provided is a system which uses an absorbing fluid and causes the absorbing fluid to have a greater degree of contact with the oil contaminants in the produced-water. The produced-water is directed into a wet spiral absorber-contactor and then to a separator having a downflow spreader system where the clean water and absorbing fluid containing the oil contaminants are separated. The clean water is released into the surrounding environment and absorbing fluid that is not completely spent is recycled to the absorber-contactor for further use. Absorbing fluid that is spent is directed to reclaiming means where the absorbing fluid is treated by a vacuum distillation process so that it may be reused. Means for reintroducing reclaimed absorbing fluid into the system is also provided. The oil removed from the absorbing fluid may then be stored and processed for sale.

In view of the above, it is an object of the present invention to provide a water degreaser system of greater efficiency than presently existing systems.

It is another object of the present invention to provide a system which recycles absorbing fluid.

In view of the above objects it is a feature of the present invention to provide a separator for recycling unspent absorbing fluid.

It is another feature of the present invention to provide a distillation system for reclaiming spent absorbing fluid.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 1:
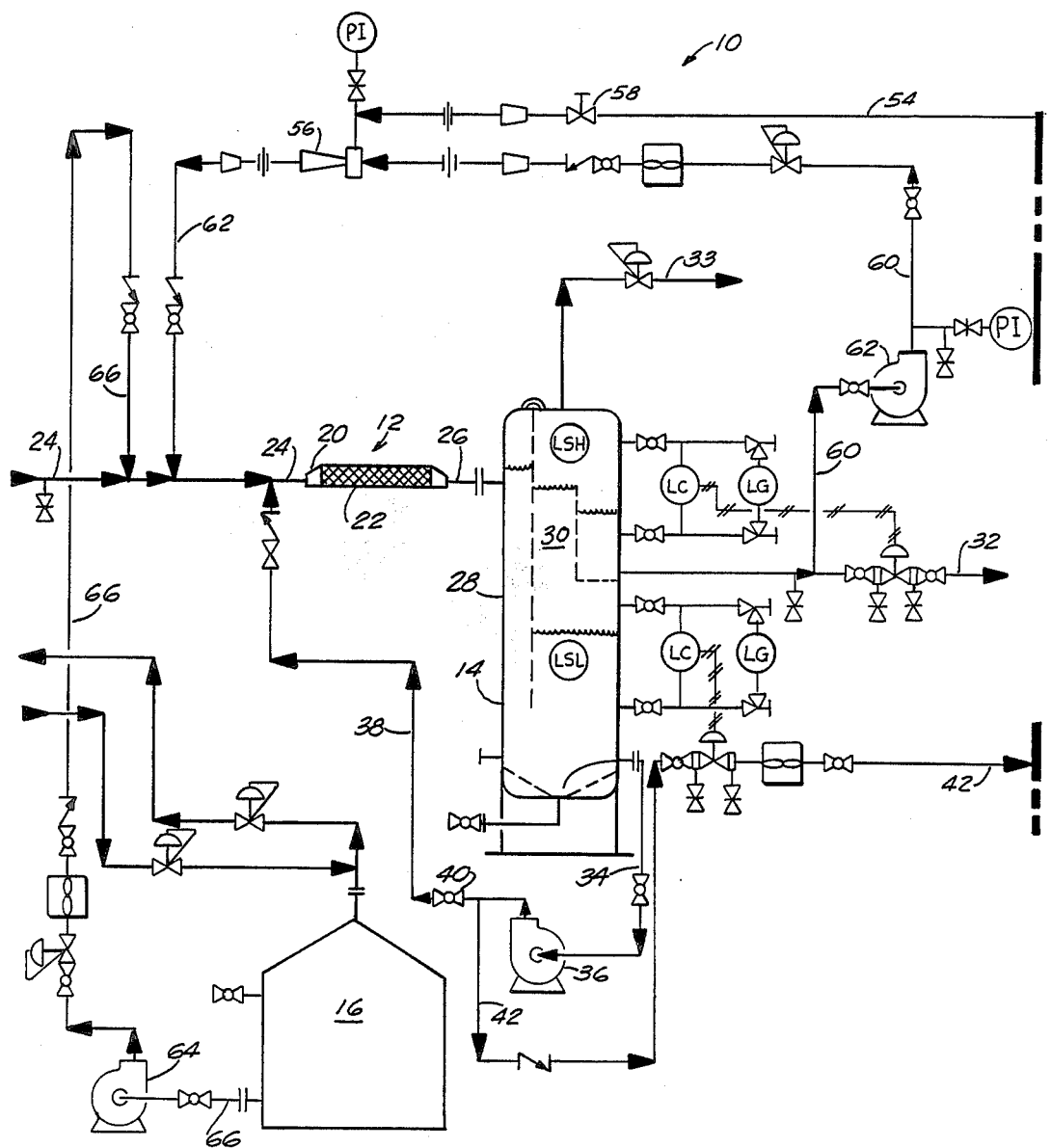
FIG. 1 is a schematic illustration of that portion of the system of the present invention illustrating the wet spiral absorber-contactor, processing separator having a downflow spreader system and storage tank.

Referring now to the drawing, it can be seen that the invention is generally referred to by the numeral 10. Water degreaser system 10 is generally comprised of absorber means 12, processing separator means 14, storage tank 16, and absorbing fluid reclaiming means 18.

Absorber means 12, illustrated schematically in FIGURE 1, may be of any suitable type known in the industry, but in the preferred embodiment, is a wet spiral absorber-contactor 20 as this has been found to produce the best results and reduce the retention time required for separation of the fluids. Absorber-contactor 20 (such as that taught in Black's U.S. Pat. No. 4,060,912, discussed in the Background Of The Invention section above) is comprised of a cylinder 22 having an inlet at line 24 for receiving produced-water from a source (not shown) and absorbing fluid and an outlet at line 26 for directing the mixture of treated produced-water and absorbing fluid to processing separator means 14. Inside of cylinder 22 is a centrally located axially disposed shaft having a fin or fins spirally wrapped around and affixed thereto. Segments of plates, which may be notched, are connected to adjacent reaches of the spiral fins and assure that the producedwater being treated dips into the absorbent fluid present in cylinder 22. In the preferred embodiment, the absorbing fluid used is FREON® (the proprietary rights of another in this trademark are acknowledged by the applicant; FREON® being generically described as "any of a group of nearly odorless, colorless, gaseous carbon compounds, each of which has one or more atoms of fluorine, used as refrigerants, aerosol propellants and solvents," The World Book Dictionary, 1975 Edition), the reason for which will become apparent later in this detailed description.

Processing separator means 14 receives the treated fluid from absorber-contactor 20 via line 26. Processing separator means 14 is preferably a vertical positioned vessel 28 and generally comprised of a downflow spreader means or system 30. (Vessel 28 may, in an alternate embodiment, be a horizontally positioned vessel). Treated fluid (produced-water/absorbing fluid mixture) is received in vessel 28 through line 26 where spreader system 30 promotes separation of the decontaminated water and absorbing fluid. As the absorbing fluid (FREON ®) has a higher specific gravity than water, the absorbing fluid and contaminants which have been removed from the produced-water settle through spreader system 30 to the lower end of vessel 28. It can thus be seen that decontaminated water suitable for release to the surrounding environment will be present near the top of vessel 28. Such decontaminated water is drawn from the upper levels of spreader system 30 and released through water outlets 32. Produced-water contains produced-gas entrained therein which is released in the system through gas outlet 33.

During the earlier stages of processing the produced-water, the capacity of the absorbing fluid to absorb contaminants is not completely utilized. To provide for the most efficient use of the absorbing fluid, means for recycling the absorbing fluid through absorber-contactor 20 is provided. Line 34 provided near the bottom of vessel 28 supplies absorbing fluid to absorbing fluid pump 36 which pumps the absorbing fluid back into line 24 and absorber-contactor 20 via recycle line 38. When the absorbing fluid is substantially spent and has absorbed the maximum amount of contaminants possible, valve 40 is closed to cause diversion of the absorbing fluid to absorbing fluid reclaiming means 18 via treatment line 42.

Figure 2:
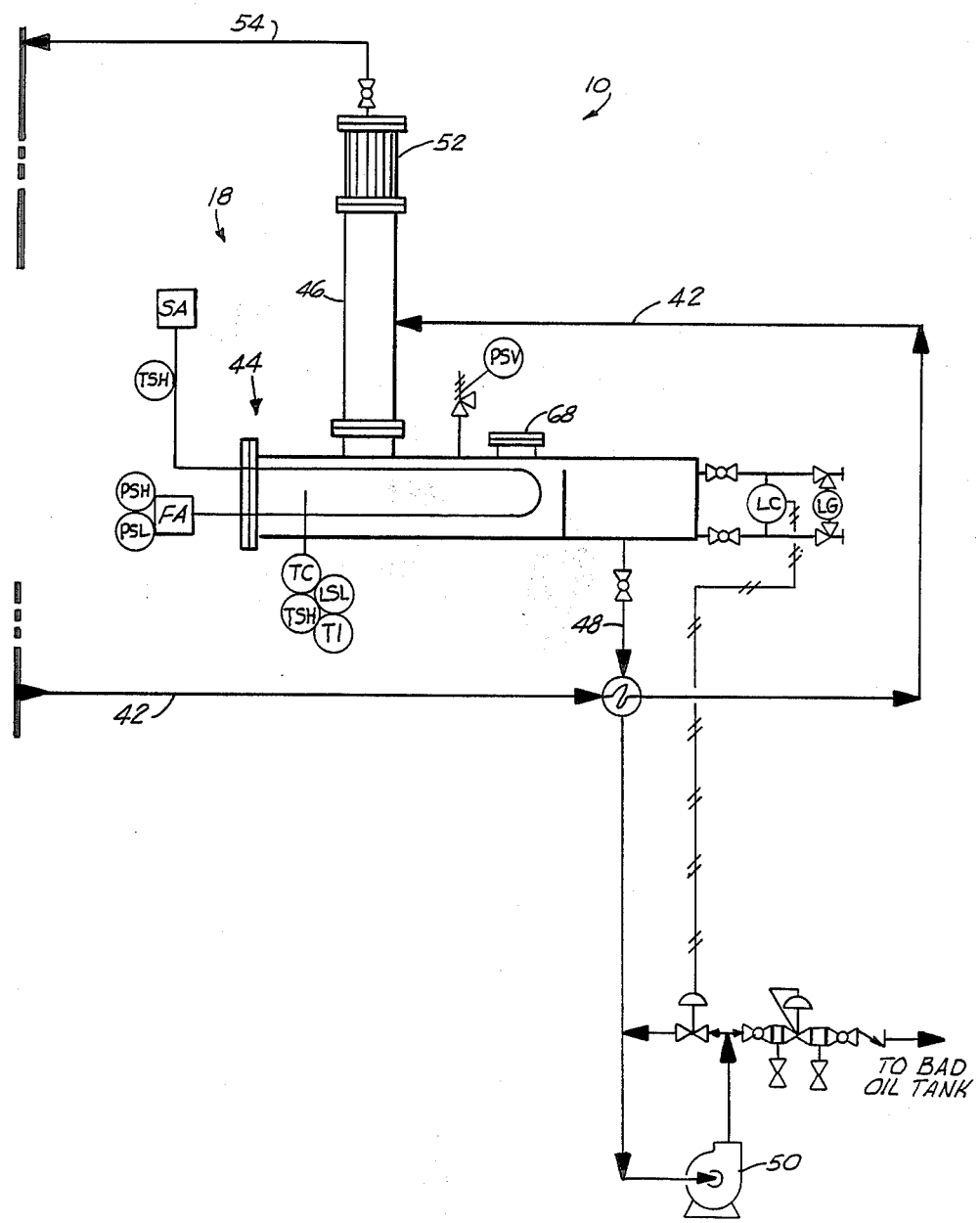
FIG. 2 is a schematic illustration of that portion of the system illustrating the vacuum distillation unit.

In the preferred embodiment, absorbing fluid reclaiming means 18, best illustrated schematically in FIG. 2, is generally comprised of a distillation treatment vessel 44 having a heating area through which the absorbing fluid flows. Heating may be accomplished by hot liquid, electrical resistance heating and/or direct fire with the controlling vaporizing temperature depending on the absorbing fluid being used. FREON ® is used in the preferred embodiment as it has a boiling point much lower than the contaminants it is being used to absorb. As the absorbing fluid passes through heating area 46, it is vaporized, leaving the oil contaminants to flow downwardly into the lower portion of vessel 44 where the oil is collected and eventually drained through oil drain line 48 and oil pump 50 to a bad oil tank (not shown) for storage, further processing and sale. Means for condensing the vapor of the treated or distilled absorbing fluid is provided by drawing the vapor upward through fin area 52, where it is cooled in preparation for condensation back into liquid form by eductor jet pump 56. Adjustable choke 58 is used to control the rate of vapor flow through line 54 to jet pump 56.

Jet pump 56 is driven by treated water which is drawn from water outlet 32 through line 60 and pumped by water pump 62 to jet pump 56. As the vapor and water are mixed together in jet pump 56, the water causes condensation of the vapor and the fresh water/absorbing fluid mixture is directed back into line 24 via line 62 for reuse in absorber-contactor 20.

Storage tank 16 is used for storage of FREON ® which is required for make-up and recharging the water treating system. It is seen that fluid from tank 16 is supplied to line 24 through pump 64 and line 66.

To provide for easing servicing of absorbing fluid reclaiming means 18, manway 68 is provided. As an option, a second vacuum distillation treatment vessel (not shown) may be provided depending on the size and capacity of the system and the oil concentration desired to be recovered from the produced-water. Naturally, all components of the system are designed to be constructed to meet ASME codes, offshore requirements and required safety systems.

In operation, as best illustrated schematically in FIG. 1, absorber means 12 receives produced-water to be decontaminated via line 24. Fins and plates on a shaft in absorber means 12 cause increased contact of the produced-water with absorbing fluid for efficient absorption of contaminants. The mixture of decontaminated water and absorbing fluid containing the contaminants is directed to processing separator means 14 through line 26. Downflow spreader system or means 30 promotes separation by allowing the heavier absorption fluid to settle to the bottom of vertical vessel 28. Unspent absorbing fluid is recycled to absorber means 12 and treated fluid is released to the surrounding environment via lines 34, 33 and 32, respectively. Spent absorbing fluid is directed to absorbing fluid reclaiming means 18 via lines 34 and 42 (schematically from FIG. 1 to FIG. 2) where the absorbing fluid and contaminants are separated by a vacuum distillation process for reclaiming the absorbing fluid for further use. Separated oil is directed to a bad oil storage tank for further processing. Absorbing fluid vapor is drawn off by eductor jet pump 56 where it is condensed by mixing with treated water drawn from line 32, which water also drives jet pump 56. The absorbing fluid and water mixture is then redirected to absorber means 12 for further use.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:
1. A water degreaser system comprising:
 (a) absorber means for receiving and treating produced-water with absorbing fluid;
 (b) processing separator means for receiving treated water from said absorbing means and separating decontaminated water from said absorbing fluid;
 (c) means connected to said absorber means and processing separator means for recycling unspent absorbing fluid to said absorber means;
 (d) means connected to said processing separator for receiving spent absorbing fluid and reclaiming said absorbing fluid for further use; and
 (e) means connected to said absorbing fluid reclaiming means, said processing means and said absorber means for reintroducing reclaimed absorbing fluid into said system, said reintroducing means including an eductor jet pump driven by decontaminated water from said processing separator means.

2. The system of claim 1, further comprising: a storage tank for additional absorbing fluid connected to said absorber means.

3. The system of claim 1, wherein said absorber means comprises a wet spiral absorber-contactor.

4. The system of claim 3, wherein said wet spiral absorber-contactor comprises:
(a) a cylinder;
(b) a centrally located and axially disposed shaft in said cylinder and having fins spirally wrapped around said shaft; and
(c) plates attached to said fins.

5. The system of claim 1, wherein said processing separator means includes a vertically positioned vessel.

6. The system of claim 1, wherein said processing separator means includes a horizontally positioned vessel.

7. The system of claim 1, wherein said means for recycling unspent absorbing fluid comprises: a fluid line and pump connected to said absorber means adjacent the bottom portion of said processing separator means.

8. The system of claim 1, wherein said means for reclaiming spent absorbing fluid includes a distillation treatment vessel.

9. A water degreaser system, comprising:
(a) a wet spiral absorber-contactor with absorbing fluid therein for receiving and treating produced-water;
(b) processing separator means for receiving treated water from said absorber-contactor and separating decontaminated water from said absorbing fluid;
(c) means connected to said absorber-contactor and said processing separator means for recycling unspent absorbing fluid to said absorber-contactor;
(d) means connected to said processing separator for receiving spent absorbing fluid and reclaiming said absorbing fluid for further use; and
(e) means connected to said absorbing fluid reclaiming means, said processing separator means and said absorber-contactor for reintroducing reclaimed absorbing fluid into said system, said reintroducing means includes an eductor jet pump driven by decontaminated water from said processing separator means.

10. The system of claim 9, wherein said processing separator means includes a vertically positioned vessel.

11. The system of claim 9, wherein said processing separator means includes a horizontally positioned vessel.

12. The system of claim 9, wherein said means for recycling unspent absorbing fluid comprises: a fluid line and pump connected to said absorber means adjacent the bottom portion of said processing separator means.

13. The system of claim 9, wherein said means for reclaiming spent absorbing fluid includes a distillation treatment vessel.

14. A water degreaser system comprising:
(a) a wet spiral absorber-contactor with absorbing fluid therein for receiving and treating produced-water and having a cylinder with a centrally located and axially disposed shaft therein, having fins spirally wrapped around said shaft and segmented plates attached to said fins;
(b) processing seperator means for receiving treated water from said absorber-contactor and seperating decontaminated water from said absorbing fluid;
(c) a fluid line and pump connected adjacent the bottom of said processing separator means and to said absorber-contactor for recycling unspent absorbing fluid;
(d) means connected to said processing separator for receiving spent absorbing fluid and reclaiming said absorbing fluid for further use; and
(e) means connected to said absorbing fluid reclaiming means, said processing separator, and said absorber-contactor for reintroducing reclaimed absorbing fluid into said system, said reintroducing means including an eductor jet pump driven by decontaminated water from said processing separator.

15. The system of claim 14, wherein said means for reclaiming spent absorbing fluid includes a distillation treatment vessel.

16. A method for degreasing water, comprising:
(a) receiving and treating produced-water with absorbing fluid;
(b) receiving treated water from said absorbing means and separating decontaminated water from said absorbing fluid;
(c) recycling unspent absorbing fluid to said absorber means;
(d) receiving spent absorbing fluid and reclaiming said absorbing fluid for further use; and
(e) reintroducing reclaimed absorbing fluid into said system by means including an eductor jet pump driven by said decontaminated water.

17. A method for degreasing water, comprising:
(a) receiving and treatment produced-water with absorbing fluid in a wet-spiral absorber-contactor;
(b) receiving treated water from said absorber-contactor and separating decontaminated water from said absorbing fluid;
(c) recycling unspent absorbing fluid to said absorber-contactor;
(d) receiving spent absorbing fluid and reclaiming said absorbing fluid for further use; and
(e) reintroducing reclaimed absorbing fluid into said system by means including an eductor jet pump driven by said decontaminated water.

* * * * *